United States Patent [19]

Ishino et al.

[11] Patent Number: 4,667,762
[45] Date of Patent: May 26, 1987

[54] DRIVE MECHANISM FOR BALLOON TIRED MOTORCYCLE

[75] Inventors: Katsuya Ishino, Iwata; Masahiro Kawashima, Shizuoka, both of Japan

[73] Assignee: Yamaha Hatsudoki Kabushiki Kaisha, Iwata, Japan

[21] Appl. No.: 829,782

[22] Filed: Feb. 14, 1986

[30] Foreign Application Priority Data

Feb. 15, 1985 [JP] Japan ............................... 60-26528

[51] Int. Cl.$^4$ ............................................. B62M 17/00
[52] U.S. Cl. .................................... 180/226; 180/227; 180/231
[58] Field of Search ..................... 180/226, 227, 231

[56] References Cited

U.S. PATENT DOCUMENTS 4,553,622 11/1985 De Cortanze ..................... 180/226

FOREIGN PATENT DOCUMENTS

| 932890 | 8/1955 | Fed. Rep. of Germany ...... 180/226 |
| 1162201 | 9/1958 | France ............................... 180/226 |
| 49-27375 | 7/1974 | Japan . |
| 58-131853 | 7/1983 | Japan . |

Primary Examiner—John A. Pekar
Attorney, Agent, or Firm—Ernest A. Beutler

[57] ABSTRACT

An improved drive arrangement for an off the road motorcycle having a rear wheel that has a width substantially equal to the width of the motorcycle frame. The rear wheel is supported by a trailing arm and is driven by a drive that includes an intermediate shaft that is rotatably journaled on the trailing arm. One end of the intermediate shaft is driven from the engine output shaft by a drive shaft and the other end of the intermediate shaft drives the rear wheel through a chain. The chain is positioned a substantially greater distance outwardly from the longitudinal center line of the motorcycle than is the drive shaft so as to afford a good rider position and relatively narrow width.

12 Claims, 3 Drawing Figures

DRIVE MECHANISM FOR BALLOON TIRED MOTORCYCLE

BACKGROUND OF THE INVENTION

This invention relates to an improved drive mechanism for a balloon tired motorcycle and more particularly to the rear wheel drive for such a vehicle which incorporates a drive shaft.

Recently, it has been proposed to construct motorcycles for off the road use that use large, low pressure balloon tires for at least their rear wheels. The use of such large low pressure tires gives added stability and advantages for the off the road use. However, when such a wide rear tire is used, there are certain difficulties in connection with driving the tire. If the engine, which is mounted on the frame, includes a chain drive for the rear wheel and the rear wheel is driven directly from a sprocket on the engine output shaft, the driving chain is positioned well outwardly of the longitudinal center line of the motorcycle and in the position where it may interfere with the rider's legs.

To offset the aforenoted disadvantage, it has been proposed to provide a two chain arrangement for driving the rear wheel. Such an arrangement is shown in copending application Ser. No. 632,717, filed July 20, 1984 in the name of Nobuaki Shiraishi, entitled "Offroad Running Motorcycle" and assigned to the same assignee as this application, and comprises an intermediate shaft that is supported on the trailing arm suspension of the rear wheel and which is driven from a first chain that is driven directly by the engine output shaft and which is positioned relatively close to the longitudinal center line of the motorcycle. The intermediate shaft, in turn, drives the rear wheel through a second chain that is positioned a substantially greater distance outwardly from the center line so as to clear the rear wheel. Although this arrangement has advantages, it also has certain defects.

When such a two chain arrangement is employed embodying an intermediate shaft, it becomes very difficult to provide a mechanism for adjusting the tension of both of the driving chains. That is, it is not possible to adjust both chains sufficiently with a single adjustment of the intermediate shaft and the adjusting structure, therefore, becomes complicated. In addition, the flight between the engine output shaft and the intermediate shaft is relatively short and thus the first driving chain undergoes considerable stresses because of this short length and the life of the first driving chain can be significantly shortened.

It is, therefore, a principal object of this invention to provide an improved driving arrangement for an off the road motorcycle embodying a balloon tired rear wheel.

It is a further object of this invention to provide an offset driving arrangment for the rear wheel of such a motorcycle and one that does not employ two driving chains.

It is a further object of this invention to provide an offset drive arrangement for the balloon tired rear wheel of an off the road motorcycle that incorporates a drive shaft.

SUMMARY OF THE INVENTION

A first feature of this invention is adapted to be embodied in an off the road motorcycle having frame means, at least one balloon tired rear wheel having a width substantially the same as the width of the frame means and trailing arm means that support the rear wheel for movement relative to the frame means. An engine is supported by the frame means and drives an output element. A final drive element is affixed for rotation with the rear wheel for driving the rear wheel and is placed substantially farther from the longitudinal center line of the motorcycle than the output element. In accordance with this feature of the invention, means are provided for driving the final drive element from the output element which includes a drive shaft that rotates about a generally longitudinally extending axis.

Another feature of the invention is adapted to be embodied in an off the road motorcycle that has a frame means and at least one rear wheel that is supported by a trailing arm for movement relative to the frame means. An engine is supported by the frame means and drives an output element. A final drive element is affixed for rotation with the rear wheel for driving the rear wheel. In accordance with this feature of the invention, an intermediate shaft is rotatably journaled on the trailing arm for rotation about an axis that extends generally transversely relative to the longitudinal center line of the frame means. Means are provided for driving one end of the intermediate shaft from the engine output element and for driving the final drive element from the other end of the intermediate shaft. In accordance with this feature of the invention, one of these means includes a drive shaft.

DETAILED DESCRIPTION OF THE PREFERRED EMBODIMENT

Figure 1:
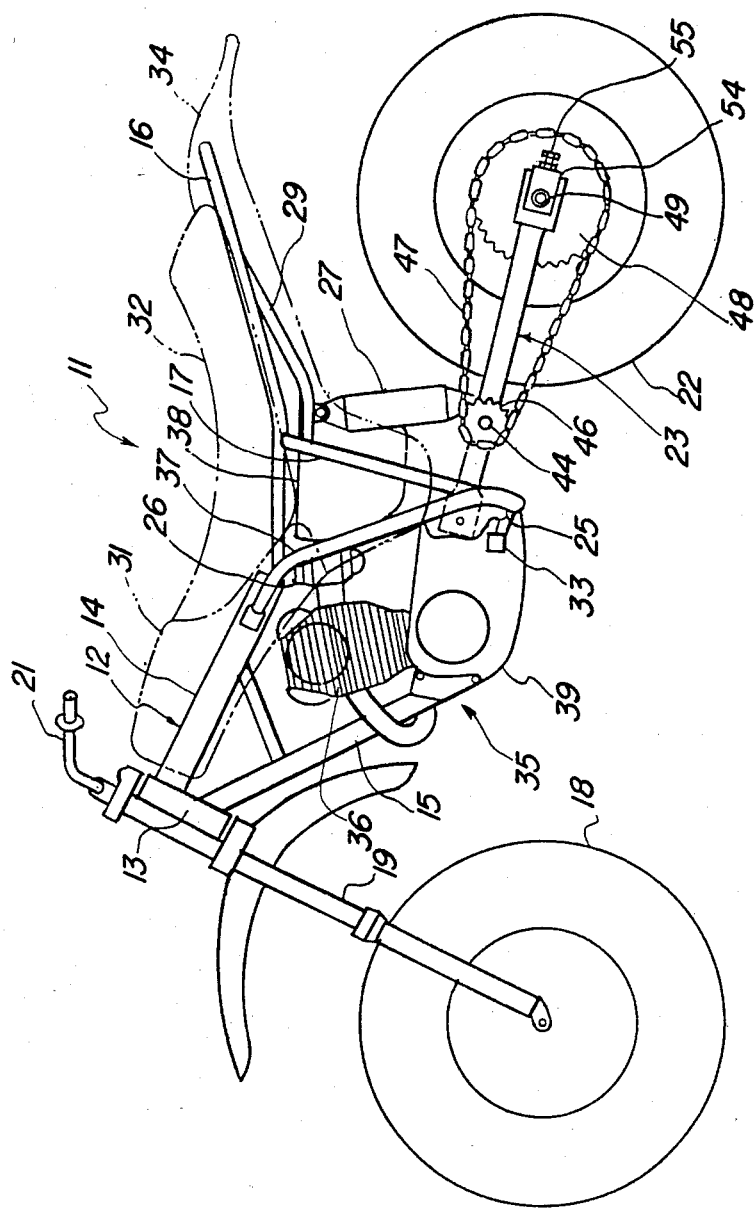
FIG. 1 is a side elevational view of an off the road motorcycle constructed in accordance with an embodiment of the invention, with portions shown in phantom.

A motorcycle constructed in accordance with an embodiment of the invention is identified generally by the reference numeral 11 and includes a frame assembly 12 which may be of any known type and which is illustrated as being of the welded up tubular type of construction. The frame assembly 12 includes a head pipe 13, main pipe 14 and down tubes 15 that are connected to each other in an appropriate manner. A seat rail 16 extends rearwardly from the main tube 14 and is supported at least in part by a seat pillar rail 17.

A front wheel carrying a large, low pressure balloon tire 18 is supported by means of a front fork assembly 19. The front fork assembly 19 is, in turn, journaled for steering movement by the head pipe 13 in a known manner. A handlebar assembly 21 is carried at the upper end of the front fork 19 for steering of the front wheel 18 in a known manner.

Figure 3:
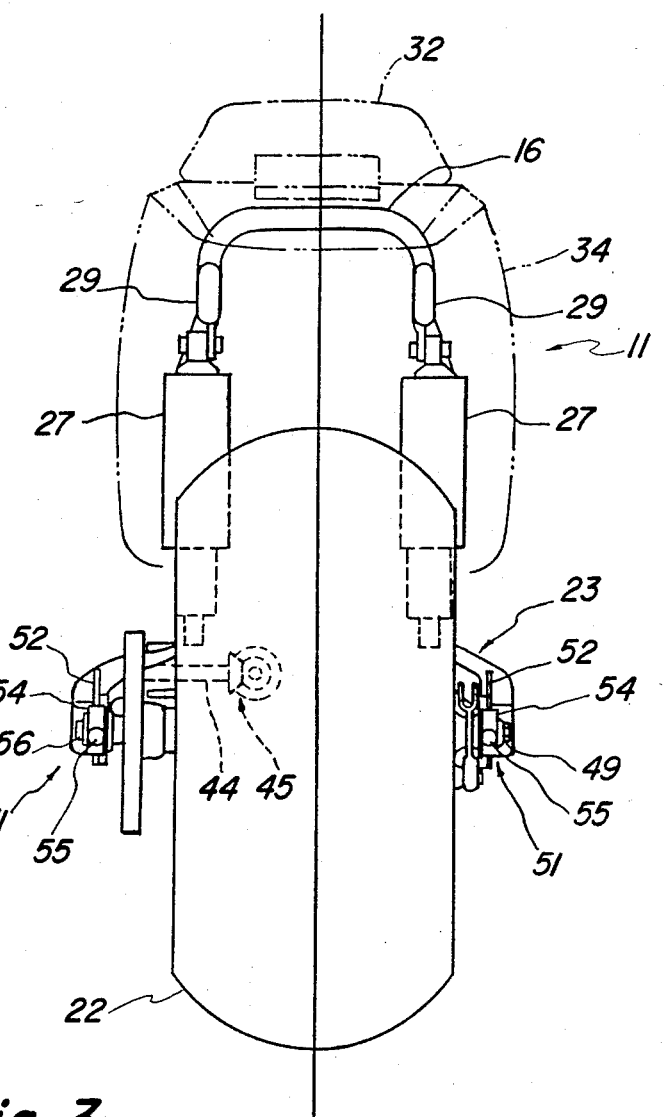
FIG. 3 is an enlarged rear elevational view of the motorcycle.

A rear wheel carrying a large, low pressure balloon tire is indicated generally by the reference numeral 22 and is supported by means of a trailing arm assembly, indicated generally by the reference numeral 23. It should be noted, particularly from FIG. 3, that the width of the rear wheel 22 is at least equal to and slightly greater than the width of the frame assembly 12.

Figure 2:
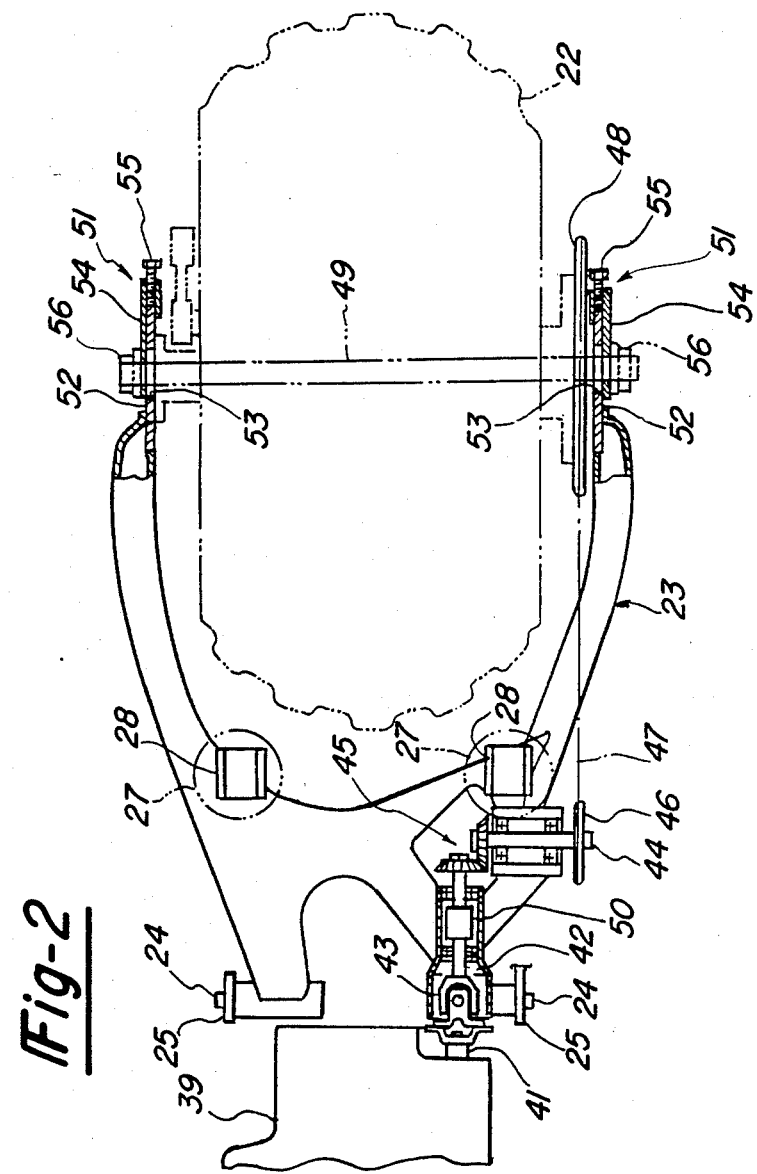
FIG. 2 is an enlarged top plan view showing the rear suspension of the motorcycle and its final drive arrangement, with portions broken away and other portions shown in phantom.

The trailing arm assembly 23 is depicted as having a bifurcated shape, as shown in FIG. 2, and is pivotally supported at its forward end by means of a pair of stub pivot shafts 24. The pivot shafts 24 are, in turn, fixed relative to brackets 25 that are affixed to the rear end of the frame assembly and particularly to a pair of back tubes 26 of the frame assembly. Although the trailing arm assembly 23 is shown as being of the bifurcated type, it is to be understood that the invention may be employed with other types of trailing arm suspensions, such as those of the so-called cantilevered type.

The suspension movement of the trailing arm assembly 23 and rear wheel 22 relative to the frame assembly 12 is controlled by means of pair of combined shock absorber and coil spring assemblies, indicated generally by the reference numeral 27. These shock absorber and spring assemblies 27 are connected at their lower ends to brackets 28 formed on the trailing arm 23 immediately adjacent the area where it bifurcates. The upper ends of the combined spring and shock absorber assemblies 27 are connected to the frame 12 and specifically to brackets that are affixed to reinforcing braces 29 that extend between the seat pillar rails 17 and the seat rails 16.

A fuel tank 31 is carried by the frame assembly 12 over the main pipe 14 and rearwardly of the head pipe 13. Rearwardly of the fuel tank 31, a seat assembly 32 is supported on the frame 12 and specifically on the seat rails 16, seat pillar rails 17 and reinforcing tubes 29. In order to afford comfort for the rider, a pair of foot pegs 33 are carried at the lower end of the frame 12 to accommodate the rider's feet. A fender 34 is carried by the frame beneath the seat 32 and overlying the rear wheel 22.

A power plant, indicated generally by the reference numeral 35, is carried by the frame 12. The power plant 35 includes an internal combustion engine 36 which may be of any known type and which includes one or more carburetors 37 that deliver a fuel/air charge to the engine 36. An air cleaner 38 is provided for delivering air to the carburetors 37.

The power plant 35 further includes a change speed transmission that is contained within a combined crankcase, transmission assembly 39. The change speed transmission may be of any known type and drives an output element in the form of an output shaft 41 that extends generally longitudinally relative to the center plane of the motorcycle 11 and which is offset slightly to one side of it as is clearly shown in FIGS. 2 and 3.

The output shaft 41 drives a drive shaft 42 that extends in a generally longitudinal direction and which is placed in line with the output shaft 41 and hence which lies close to the longitudinal center line of the motorcycle 11. A universal joint 43 rotatably connects the engine output shaft 41 with the drive shaft 42.

An intermediate shaft 44 is journaled for rotation on the trailing arm 23 in an appropriate manner. A bevel gear assembly 45 is provided between the drive shaft 42 and one end of the intermediate shaft 44 for driving the intermediate shaft 44 for rotation about an axis that extends transversely to the longitudinal axis of the motorcycle. A splined connection 50 in the drive shaft 42 accommodates changes in length as may occur due to the suspension travel.

A sprocket 46 is affixed for rotation to the opposite end of the intermediate shaft 44 and is positioned laterally outwardly of the center line of the motorcycle a substantial distance from the drive shaft 42 and engine output shaft 41. The sprocket 46 drives a chain 47 which, in turn, drives a sprocket 48 that is affixed for rotation with the rear wheel 22. The rear wheel 22 is rotatably supported on the trailing arm assembly 23 by means including an axle shaft 49. It should be noted that although a chain drive 47 is illustrated and described, that the invention may also be utilized in conjunction with a toothed belt drive or any other type of flexible transmitter drive.

The rear axle 49 is supported for movement along the length of the trailing arm 23 by means of a tensioning adjustment mechanism, indicated generally by the reference numeral 51, which is incorporated so as to adjust the tension of the chain 47. It should be noted that there is one tension adjusting mechanism 51 at each end of the bifurcation of the trailing arms 23 so that adjustment at each side of the axle 49 is accomplished. For this purpose, there is provided a plate 52 at each end of the trailing arm 23 which plate defines a longitudinal slot 53 in which the ends of the axle 49 is received. A tensioning element 54 has a generally channel shape and is received over the plate 52 and carries the ends of the axle 49. An adjusting screw 55 is provided on the tensioning element 54 and engages the rear edge of the plate 52 so as to control the axial position of the shaft 49 with respect to the plates 52 and, accordingly, the trailing arm assemby 23. Nuts 56 are provided for locking the axle 49 to the tensioning elements 54 and, accordingly, to the plates 52.

It should be readily apparent that the described drive arrangement permits a compact assembly positioned between the legs of the rider on the seat 32 even though the final drive element for the rear wheel (in the this case the sprocket 48) is positioned a substantial distance outwardly of the longitudinal center line of the motorcycle. The drive includes only a single driving chain and hence the tensioning problems attendant with prior art type of devices that incorporated two driving chains are avoided. In addition, highly stressed short length chains are avoided.

Although an embodiment of the invention has been illustrated and described, various changes and modifications may be made without departing from the spirit and scope of the invention, as defined by the appended claims.

We claim:

1. In an off the road motorcycle having frame means, a seat carried by said frame means for carrying a rider in straddle fashion with the rider's legs lying on opposite sides of said frame means, at least one balloon tired rear wheel having a width substantially the same as the width of said frame means disposed rearwardly and beneath said seat, trailing arm means for supporting said rear wheel for pivotal movement relative to said frame means about a pivot axis lying under said seat, an engine supported by said frame means and driving a drive shaft extending longitudinally of said motorcycle, a final drive element affixed for rotation with said rear wheel for driving said rear wheel, said drive shaft lying substantially closer to the longitudinal center of said motorcycle than said final drive element, the improvement comprising an intermediate shaft journaled on said trailing arm rearwardly of its pivot axis means for driving said final drive element from the outer end of said intermediate shaft and means for driving the inner end of said intermediate shaft from said drive shaft.

2. In an off the road motorcycle as set forth in claim 1 wherein the inner end of the intermediate shaft is driven by the drive shaft by intermeshing bevel gears.

3. In an off the road motorcycle as set forth in claim 2 wherein a universal joint is interposed in the drive shaft.

4. In an off the road motorcycle as set forth in claim 3 wherein the final drive element comprises a sprocket affixed for rotation with the rear wheel and the sprocket is driven by means of a flexible transmitter from the outer end of the intermediate shaft.

5. In an off the road motorcycle as set forth in claim 4 further including means for changing the tension of the flexible transmitter element.

6. In an off the road motorcycle as set forth in claim 5 wherein the means for changing the tension comprises means for moving the axis of rotation of the rear wheel relative to the pivot axis of the trailing arm means.

7. In an off the road motorcycle having frame means, a seat carried by said frame means for carrying a rider in straddle fashion with his legs lying on opposite sides of said frame means, at least one rear wheel, trailing arm means for supporting said rear wheel for pivotal movement relative to said frame means about a pivot axis disposed beneath said seat, an engine supported by said frame means, an intermediate shaft supported for rotation about an axis extending transversely relative to the longitudinal center line of said frame means by said trailing arm means and rearwardly of said pivot axis, the improvement comprising drive means for driving one end of said intermediate shaft from said engine and for driving said rear wheel from the other end of said intermediate shaft, said drive means including a drive shaft.

8. In an off the road motorcycle as set forth in claim 7 wherein the drive shaft drives the one end of the intermediate shaft from the engine.

9. In an off the road motorcycle as set forth in claim 8 further including a universal joint for driving the drive shaft from the engine.

10. In an off the road motorcycle as set forth in claim 9 wherein the other end of the intermediate shaft drives the rear wheel by means of a flexible transmitter.

11. In an off the road motorcycle as set forth in claim 10 further including means for changing the tension of the flexible transmitter element.

12. In an off the road motorcycle as set forth in claim 11 wherein the means for changing the tension comprises means for moving the axis of rotation of the rear wheel relative to the pivot axis of the trailing arm means.

* * * * *